G. A. BOWERS.
Improvement in Grocers' Scoops.

No. 132,134.                              Patented Oct. 15, 1872.

Witnesses
S. M. Millard
Julius Nelson

Inventor
George A. Bowers
By Gridley & Warner
Attys

UNITED STATES PATENT OFFICE.

GEORGE A. BOWERS, OF CHICAGO, ILLINOIS, ASSIGNOR TO FRANK STURGES & CO., OF SAME PLACE.

IMPROVEMENT IN GROCERS' SCOOPS.

Specification forming part of Letters Patent No. 132,134, dated October 15, 1872.

*To all whom it may concern:*

Be it known that I, GEORGE A. BOWERS, of Chicago, in the county of Cook and State of Illinois, have invented certain new and useful Improvements in Grocers' Scoops, of which the following is a full, clear, and exact description, which will enable others skilled in the art to which my invention appertains to make and use the same, reference being had to the accompanying drawing forming a part of this specification, and in which—

Figure 1:
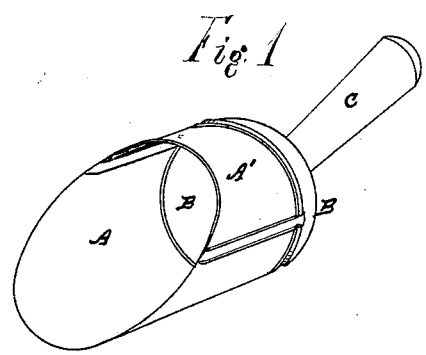
Figure 2:
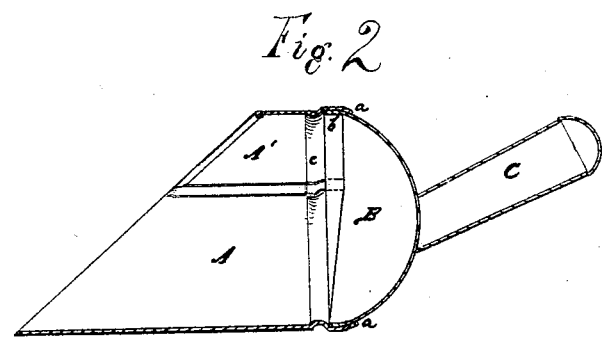

Figure 1 represents a perspective view of my improved scoop; and Fig. 2, a vertical central longitudinal section of the same.

My invention consists in certain novel features relating to the construction of scoops of the class referred to, and which are hereafter fully set forth.

In the drawing, A and A' represent the body of the scoop, consisting of a hollow cylinder cut away at its forward end in the manner shown. This body may be made of the part A only, but I deem it preferable to make it of two parts, as shown, both parts being firmly secured together. B is the base or bowl of the scoop, consisting of one piece of sheet metal stamped in the form of a segment of a sphere. C is a handle, attached to the bowl in any suitable manner. In order to attach the base to the body I "draw up" the upper edge of the bowl to the extent of about three-sixteenths of an inch from its extreme edge, so that the portion so drawn up will be cylindrical, as shown at *b*. The body is then slipped over the edge of the bowl, somewhat beyond that part of the latter which is drawn up, and the edge of the body is then firmly "set down" upon the convex surface of the bowl, as shown at *a*. The body is also crimped inward just forward of its point of attachment to the bowl, as shown at *c*. A "slip-lock" joint is thus formed, which firmly secures the body to the bowl, and the operation is performed with greater facility than by "double-seaming" them together.

Having thus described my invention, what I claim as new, and desire to secure by Letters Patent, is—

A grocer's scoop having the bowl or base B attached to the scoop by means of a "slip-lock" joint, constructed substantially as specified.

GEORGE A. BOWERS.

Witnesses:
F. F. WARNER,
N. C. GRIDLEY.